UNITED STATES PATENT OFFICE.

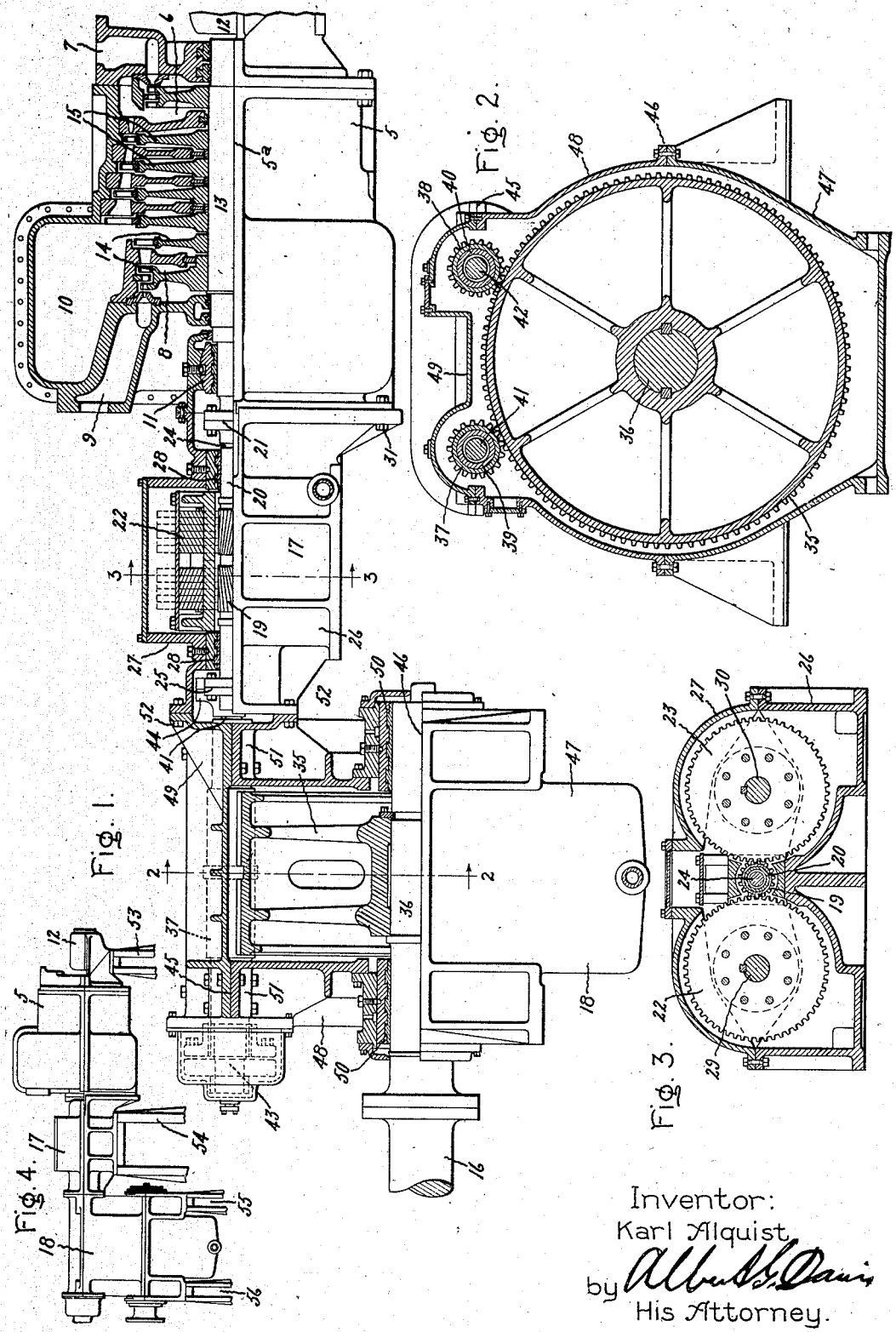

KARL ALQUIST, OF SCHENECTADY, NEW YORK.

GEARED SET.

1,181,717.

Specification of Letters Patent.   Patented May 2, 1916.

Application filed January 31, 1916. Serial No. 75,281.

*To all whom it may concern:*

Be it known that I, KARL ALQUIST, a subject of the King of Sweden, residing at Schenectady, in the county of Schenectady, State of New York, have invented certain new and useful Improvements in Geared Sets, of which the following is a specification.

The present invention relates to geared sets of the type wherein an elastic fluid turbine drives a driven member through a double reduction gearing.

The object of the invention is to provide an improved arrangement of gearing whereby sets which vary considerably in speed ratio and output may be built up of parts which are to a great extent standardized.

For a consideration of what I believe to be novel and my invention attention is directed to the accompanying specification and the claims appended thereto.

In the accompanying drawing Figure 1 is a longitudinal view partly in section of a geared set embodying my invention; Fig. 2 is a section taken on line 2—2 Fig. 1; Fig. 3 is a section taken on line 3—3 Fig. 1; and Fig. 4 is an outline of the set illustrating the manner of supporting it.

Referring to the drawing, 5 indicates an elastic fluid turbine, a marine turbine of the impulse type being shown. It has an "ahead" section 6 to which elastic fluid is admitted by way of conduit 7 and a "reversing" section 8 to which elastic fluid is admitted by way of conduit 9. Both sections exhaust into the common exhaust chamber 10.

11 and 12 indicate bearings for the turbine shaft 13, and 15 and 14 the "ahead" and "reversing" wheels of the respective sections.

The turbine casing is built in two sections, being split horizontally at 5ᵃ. The specific type of turbine utilized, or its details of structure, form no part of the present invention, and a detailed description is thought to be unnecessary.

In the present instance the turbine 5 is shown as driving a shaft 16, which may be the propeller shaft of a boat, through a double reduction gearing comprising a high speed section 17 and a low speed section 18. The high speed section comprises a high speed pinion 19 having its shaft 20 coupled to the turbine shaft 13 as shown at 21, and two high speed gear wheels 22 and 23, arranged one on each side of the pinion 19 so that the pinion will be balanced between them, thus relieving the pinion bearings of the driving thrust. In the present instance these shafts are horizontally alined. The pinion shaft 20 is preferably hollow and is coupled to the turbine shaft 13 through an intermediate length of shaft 24 which extends through the pinion shaft 20 and has one end coupled at 21 to the turbine shaft 13 as already referred to, and the other end coupled to the pinion shaft 20 at 25. By this arrangement I obtain the benefit of a longer shaft connection in a short structure, such a shaft connection being desirable in order to assist in taking care of any slight inaccuracies in the bearing alinements. The casing for the high speed section 17 comprises a lower part 26 and an upper part 27, the line of division being on the center line of the shafts. It carries suitable bearings for pinion shaft 20 as shown at 28, and also bearings for the shafts 29 and 30 upon which the gear wheels 22 and 23 respectively are mounted. The bearing for shafts 29 and 30 do not show in the drawing, but it will be understood that they are of suitable type; for example, similar to bearings 28. The split between the two parts of the gear casing 17 is in line with the split between the two parts of turbine casing, and these two casings are bolted directly together as indicated at 31.

The low speed gearing section is built up quite independently from the high speed section. It comprises a low speed wheel 35 mounted on a shaft 36, and two low speed pinions 37 and 38 mounted on hollow shafts 39 and 40 respectively. Extending through the hollow shafts 39 and 40 are coupling shaft sections 41 and 42. These are connected at the one end to the ends of the hollow shafts 39 and 40 by means of suitable couplings 43, which are preferably sliding couplings, and at the other ends they are connected to the shafts 29 and 30 as indicated at 44. This arrangement again provides for a long shaft connection as pointed out above, and for a similar purpose. The casing for the low speed section is split horizontally at two points 45 and 46. This provides a lower part 47, an intermediate part 48, and an upper part 49. At the split 46 between the lower and intermediate parts bearings 50 are provided for the shaft 36 of low speed wheel 35, and at the split 45 between the intermediate part and the upper part bearings 51 are provided for the shafts 39 and 40. The split 45 is in alinement with the splits in the high speed gearing casing and the turbine casing, and the turbine shaft 13, the shafts 20, 29, and 30 of the high speed gearing section, and the shafts 39 and 40 of the low speed gearing section have their center lines in the same horizontal plane. The casing of the high speed gearing section 17 is bolted to the casing of the low speed gearing section 18 by bolts 52.

In the present instance the gearing is shown as being of the double helical or herringbone type and the gear wheels 22 and 23 are of the elastic or flexible type invented by me, which comprise a plurality of disks or laminæ mounted on a suitable support, firmly clamped together at their central portions, and slightly spaced apart at the periphery so as to permit of slight axial yielding under tooth pressure.

The turbine and high speed gearing section are supported mutually from the two supports 53 and 54 as shown in Fig. 4. The support 53 is located under turbine shaft bearing 12 and the support 54 under the gear casing of gearing section 17. The low speed gearing section is supported by two supports 55 and 56, located at the two ends of its casing.

In the above described arrangement the turbine is designed to run at its most efficient speed and the high speed gearing section is designed to reduce this speed to about ⅕. As is well understood, the output of a turbine may be varied over quite a range by varying the areas of the steam passages, a comparatively inexpensive change. And the output of the high speed gearing section can be changed by making the wheels of greater length. In the case of the elastic wheels, this can be accomplished by adding more disks. I thus combine the turbine and the high speed gearing section into what amounts to practically a standardized unit of constant speed relation and variable output, and provide them with common supporting means. The diameters of the high speed gear wheels remain constant for all outputs, or may be varied to some small extent while the center distances remain the same and the only change required to vary the output is to make the gear wheels longer or shorter. This requires in the gear casing only that it be made longer or shorter, which is a comparatively inexpensive change, since the same patterns with inexpensive variations can be used for molding. This will be clear when it is understood that the patterns for each part of the gear casing would be made in two sections, being divided on a central vertical line. From a given pattern, therefore, a gear casing could be made longer by inserting an intermediate filling piece between the two sections of the pattern. The turbine for a comparatively wide range of outputs would be built the same, the variations in output being obtained by varying the areas of the steam passages.

As an illustration of the importance of being able to use standardized parts in a set of this general character, it is pointed out that the cost of designing and making the patterns for such a set constitutes about one-half of the total cost of the set. A structure, therefore, which permits of the use of standard parts means a very great saving in cost of production.

To obtain various speed reductions between the turbine and the driven member, I vary the relative diameters of the low speed wheels. By this means, as is obvious, I may reduce the speed delivered by the high speed section of the gearing by any desired amount according to the requirements of the particular installation. Since the low speed gearing section is in a separate casing and is entirely self contained and separately supported, it may be changed at will without affecting the other parts of the set. Furthermore, should it be desired to change the speed ratio of a given set, all that is necessary is to remove the one low speed gearing section and substitute another for it.

The arrangement at the same time gives a structure in which the turbine and high speed gearing sections have only two supports, the casings of the same being rigidly bolted together so that the gear casing supports the one end of the turbine casing. This gives a rigid structure and has the advantage that it helps maintain the bearing alinements. At the same time it protects the parts from strains, such as might occur were three points of support provided. The casing of the low speed gearing section is separately supported and, as shown, is preferably bolted directly to the casing of the high speed gearing section. It is, however, a unit by itself, and it will be understood that my invention is not necessarily limited to these two casings being fixed together. The arrangement is an advantageous one, however, as it gives a short compact structure.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is,—

1. In a geared set, the combination of an elastic fluid turbine, a driven element, and a double reduction gearing between them comprising a high speed gearing section having a casing, one end of which is fixed to the turbine casing, said turbine and high speed gearing section constituting a unit of substantially fixed speed reduction and variable output, and a low speed gearing section connected with the high speed gearing section and having a separate casing, which casing is fixed to the high speed gearing casing, whereby the speed ratio of the set may be varied by varying the gear ratio of the low speed gearing.

2. In a geared set, the combination of an elastic fluid turbine, a driven element, and a double reduction gearing between them, comprising a high speed gearing section having a pinion balanced between two gear wheels, and provided with a casing, one end of which is fixed to and supports the corresponding end of the turbine casing, said turbine and high speed gearing section constituting a unit of substantially fixed speed reduction and variable output, and a low speed gearing section connected with the high speed gearing section and having a separate casing, which casing is fixed to the high speed gearing casing, whereby the speed ratio of the set may be varied by varying the gear ratio of the low speed gearing.

3. In a geared set, the combination of an elastic fluid turbine, a driven element, and a double reduction gearing between them comprising a high speed section and a low speed section, each mounted in a separate casing, the casing of the high speed gearing section being rigidly fixed between and directly to the casings of the turbine and low speed gearing section, so as to constitute a rigid structure, said turbine and high speed gearing section constituting a standardized unit of substantially fixed speed relation and variable output.

4. In a geared set, the combination of an elastic fluid turbine having a casing and a shaft, a gear casing fastened to the casing of the turbine, a high speed pinion in the gear casing connected to the turbine shaft, two high speed wheels in the gear casing which mesh with the pinion, a second gear casing, two low speed pinions journaled in the second casing and connected to the high speed wheels, a low speed wheel in the second gear casing which meshes with the low speed pinions, and a driven shaft to which it is connected, said second gear casing being separate from and detachably connected to the first gear casing, whereby the second gear casing and gearing may be changed to provide for different speed ratios without affecting the remainder of the set.

In witness whereof, I have hereunto set my hand this 28th day of January, 1916.

KARL ALQUIST.